(12) United States Patent
Seki

(10) Patent No.: US 6,913,435 B2
(45) Date of Patent: Jul. 5, 2005

(54) INTEGRATED VANE FOR USE IN WIND OR WATER AND PROCESS FOR PRODUCING SAME

(75) Inventor: Kazuichi Seki, Kanagawa (JP)

(73) Assignee: Tokai University Educational System, Tokyo (JP)

( * ) Notice: Subject to any disclaimer, the term of this patent is extended or adjusted under 35 U.S.C. 154(b) by 61 days.

(21) Appl. No.: 10/451,333

(22) PCT Filed: Nov. 8, 2002

(86) PCT No.: PCT/JP02/11653

§ 371 (c)(1),
(2), (4) Date: Jun. 20, 2003

(87) PCT Pub. No.: WO03/040558

PCT Pub. Date: May 15, 2003

(65) Prior Publication Data

US 2004/0042895 A1 Mar. 4, 2004

(30) Foreign Application Priority Data

Nov. 9, 2001 (JP) ........................................ 2001-344602
Dec. 27, 2001 (JP) ........................................ 2001-397074

(51) Int. Cl.[7] .............................................. F03D 7/00
(52) U.S. Cl. .................... 415/4.1; 416/175; 416/132 A; 416/230; 416/211
(58) Field of Search ................................ 416/230, 119, 416/132 A, 139 A, 131, 175, 203, 211, DIG. 8; 415/2.1–4.4, 907

(56) References Cited

U.S. PATENT DOCUMENTS

| 3,918,839 A | * | 11/1975 | Blackwell et al. | ........... 416/175 |
| 4,274,809 A | * | 6/1981 | Delgado et al. | ............ 416/117 |
| 4,415,312 A | * | 11/1983 | Brenneman | ................. 416/119 |
| 4,979,871 A | * | 12/1990 | Reiner | ........................ 415/4.2 |
| 5,518,367 A | * | 5/1996 | Verastegui | .................. 416/119 |
| 6,145,787 A | | 11/2000 | Rolls | |
| 6,379,115 B1 | * | 4/2002 | Hirai | ............................ 416/17 |

* cited by examiner

Primary Examiner—Edward K. Look
Assistant Examiner—Dwayne J. White
(74) Attorney, Agent, or Firm—Butzel Long

(57) ABSTRACT

In an integrated vane 1 for use in wind or water, main blades 3 arranged around an axial shaft 2 of the vane and support blades 4 for joining the main blades to the axial shaft are integrally formed with light and high strength fiber material such as glass fibers and carbon fibers. The main blade is symmetrical or asymmetrical in its cross sectional view and the support blade is symmetrical in its cross sectional view. The upper support blade may be asymmetrical in its cross sectional view and the lower support blade may have an up-and-down reversed shape of that of the upper support blade. A mountain-shaped portion may be formed at the ends of the main blade for reducing noise. The strength of crossing portions between the main and support blade of the vertical axis vane for use in wind or water is thus improved.

7 Claims, 5 Drawing Sheets

INTEGRATED VANE FOR USE IN WIND OR WATER AND PROCESS FOR PRODUCING SAME

BACKGROUND OF THE INVENTION (1) Field of the Invention

The present invention relates to an integrated vane for use in wind or water, in which a vertical axis vane for use in wind or water power generation is improved in terms of lightweight, strength and performance, and a process for producing such an integrated vane for use in wind or water.

(2) Description of the Related Art

In recent years, the generation of electricity by wind or water power without using fossil fuels has been recognized once again worldwide from the viewpoints of global protection of the environment, energy security and economic growth.

As for the generation of electricity by wind power, a horizontal axis vane for use in wind, which has an axial shaft extending in the horizontal direction relatively to the ground and receives wind with one or more blades of a propeller type, has conventionally been employed. However recently, a vertical axis vane for use in wind, which has an axial shaft extending in the vertical direction relatively to the ground and a plurality of blades longer than they are wide extending in parallel with the axial shaft, for example, has appeared (referring to, for example, Japanese Patent Publication No. S56-42751).

The blade in the vertical axis vane for use in wind is fixed to the axial shaft with one or two support arm(s) extending in the horizontal direction. The support arm is formed in a thin flat plate-shape in order to minimize wind resistance upon rotation. The blade extending in the vertical direction is formed in a symmetrical or asymmetrical two-dimensional cross sectional shape of a blade. The blades, the support arms and the axial shaft constitute a vane (i.e., turbine) for use in wind.

However, since the conventional blade (main blade) as described above is, for example, joined to the support arm with a bolt through a flange, therefore the joining work is complicated, and it is difficult to secure the static or dynamic strength and fatigue strength for the joined portion between the blade and the support arm, resulting in a problem that the joined portion is easily damaged by high number of revolutions beyond allowance or operation for a long period of time. Further, since the joined portion has a large size and large weight, therefore the wind resistance during rotation increases and starting stability is deteriorated, resulting in that the efficiency (i.e., power coefficient) is deteriorated and the noise is increased. Furthermore, when the vane for use in wind described above is employed as a vane for use in water for use in water power generation, problems that the joined portion has poor strength as described above and the interior of the blade is flooded from a hole for joining the blade arise, therefore the common use of a vane for use in wind and for use in water has been substantially impossible.

SUMMARY OF THE INVENTION

It is therefore an objective of the present invention to solve the above problems and to provide an integrated vane for use in wind or water and a process for producing such an integrated vane for use in wind or water, by which the strength of the joined portion between a main blade and a support arm can be increased, a complicated joining work can be omitted, the joined portion does not have a large size and large weight, the vane can be used not only as a vane for use in wind but also as a vane for use in water, and the noise is minimized.

In order to attain the above objective, the present invention is to provide an integrated vane (i.e., turbine) for use in wind or water comprising:

main blades arranged around an axial shaft of the vane; and support blades for joining the main blades to the axial shaft, wherein the main blades and the support blades are integrally formed (i.e., formed in one piece) with light and high strength fiber material such as glass fibers and carbon fibers.

With the construction as described above, since the static or dynamic strength and fatigue strength for the crossing portion between the straight blade and the support blade increase, therefore the vane is safe even when the number of rotation is abnormally increased or when we are struck by a typhoon and the vane can stand a continuous operation for a long period of time. Since the crossing portion can be made compact, light and to have low resistance and the blades are made of light and high strength materials, therefore the start performance and efficiency of the vane are improved and the noise is reduced. Since there is no joint between both blades and water does not enter thereinto, therefore the vane is useful for use in water.

Preferably, the main blade is symmetrical or asymmetrical in its cross sectional view and the support blade is symmetrical in its cross sectional view.

With the construction as described above, the crossing portion between the main blade and support blade has a symmetrical curved section shape similar to the section of the support blade, thereby the strength of the crossing portion is improved compared to a flat plate-shaped support arm of a rectangular section shape, for example. Further, when the front periphery of the section-symmetrical support blade faces the flow of wind or water, the resulting resistance is reduced, and when the rear periphery of the support blade faces the flow of wind or water, the resulting resistance is increased to give a rotational force, thereby improving the start performance and efficiency (power coefficient) of the vane.

Preferably, the main blade is symmetrical or asymmetrical in its cross sectional view, the upper support blade is asymmetrical in its cross sectional view, and the lower support blade has an up-and-down reversed shape of that of the upper support blade.

With the construction as described above, since the lift generated on the upper support blade is canceled out by the downward force affecting the lower support blade, therefore smooth rotation can be attained, the thrust force affecting a bearing of the axial shaft can be reduced and the lifetime of the bearing increases.

Preferably, a mountain-shaped portion having a height of about half of the blade thickness is integrally formed at ends of the main blade in the axial direction.

With the construction as described above, the mountain-shaped portion reduces or completely attenuates the occurrence of a vortex of wind or water at the rear of the ends of the blade, thereby attenuating the noise and preventing the environmental problem from occurring. Since the mountain-shaped portion is integrally formed with the main blade, therefore there is no joint, no water enters into the inside, and the vane looks nice.

In order to attain the above objective, the present invention is to provide a process for producing an integrated vane for use in wind or water comprising the steps of:

crossing a preform of a main blade and a preform of a support blade, each of which comprises at least foamed plastics material;

covering both of the preforms with a light and high strength bag-shaped fiber fabric such as glass fibers and carbon fibers; and adhering the bag-shaped fiber fabric to the outer surface of both of the preforms, thereby forming a hard skin with a plurality of layers of the fiber fabric.

With the construction as described above, since there is no gap on the fiber fabric and both preforms are completely covered with the bag-shaped fiber fabric, therefore the inherent strength of the fiber is maintained, the main and support blades having high strength are produced, and especially the crossing portion between the blades having high strength is produced. Therefore, the vane is safe even when the number of rotation is abnormally increased or when we are struck by a typhoon and the vane can stand a continuous operation for a long period of time. Since the crossing portion can be made compact, light and to have low resistance and the blades are made of light and high strength materials, therefore the start performance and efficiency of the vane are improved and the noise is reduced. Since there is no joint between both blades and water does not enter thereinto, therefore the vane is useful for use in water.

Preferably, a sagging portion of the fiber fabric is pushed into the foamed plastics in the crossing portion between the preform of a main blade and the preform of a support blade.

With the construction as described above, The outer surface of the main and support blades and the surface of the crossing portion can be smoothly finely finished, the desired shape of the blades can be precisely attained, the noise can be reduced due to the decrease in the resistance by the fluid, and the performance and appearance (commercial value) are improved. Since a part of the fiber fabric branch likely enters into the foamed plastic, therefore the strength of the blades and the crossing portion can be significantly improved.

Preferably, the preform of a main blade is symmetrical or asymmetrical in its cross sectional view and the preform of a support blade is symmetrical in its cross sectional view.

With the construction as described above, the crossing portion between the main blade and support blade has a symmetrical curved section shape similar to the section of the support blade, thereby the strength of the crossing portion is improved compared to a flat plate-shaped support arm of a rectangular section shape, for example. Further, when the front periphery of the section-symmetrical support blade faces the flow of wind or water, the resulting resistance is reduced, and when the rear periphery of the support blade faces the flow of wind or water, the resulting resistance is increased to give a rotational force, thereby improving the start performance and efficiency (power coefficient) of the vane.

Preferably, the preform of a main blade -is symmetrical or asymmetrical in its cross sectional view, the preform of an upper support blade is asymmetrical in its cross sectional view, and the preform of a lower support blade has an up-and-down reversed shape of that of the preform of an upper support blade.

With the construction as described above, since the lift generated on the upper support blade is canceled out by the downward force affecting the lower support blade, therefore smooth rotation can be attained, the thrust force affecting a bearing of the axial shaft can be reduced and the lifetime of the bearing increases.

Preferably, a bulging portion having a bulging height which is about half of thickness of a preform of a main blade is formed at ends of the preform of a main blade in the axial direction and the fiber fabric is adhered on the bulging portion, thereby forming a mountain-shaped portion at ends of the main blade.

With the construction as described above, the mountain-shaped portion reduces or completely attenuates the occurrence of a vortex of wind or water at the rear of the ends of the blade, thereby attenuating the noise and preventing the environmental problem from occurring. Since the mountain-shaped portion is integrally formed with the main blade, therefore there is no joint, no water enters into the inside, and the vane looks nice.

DESCRIPTION OF THE PREFERRED EMBODIMENTS

In the following, the preferred embodiments of the present invention will be explained with reference to the attached drawings.

Figure 1:
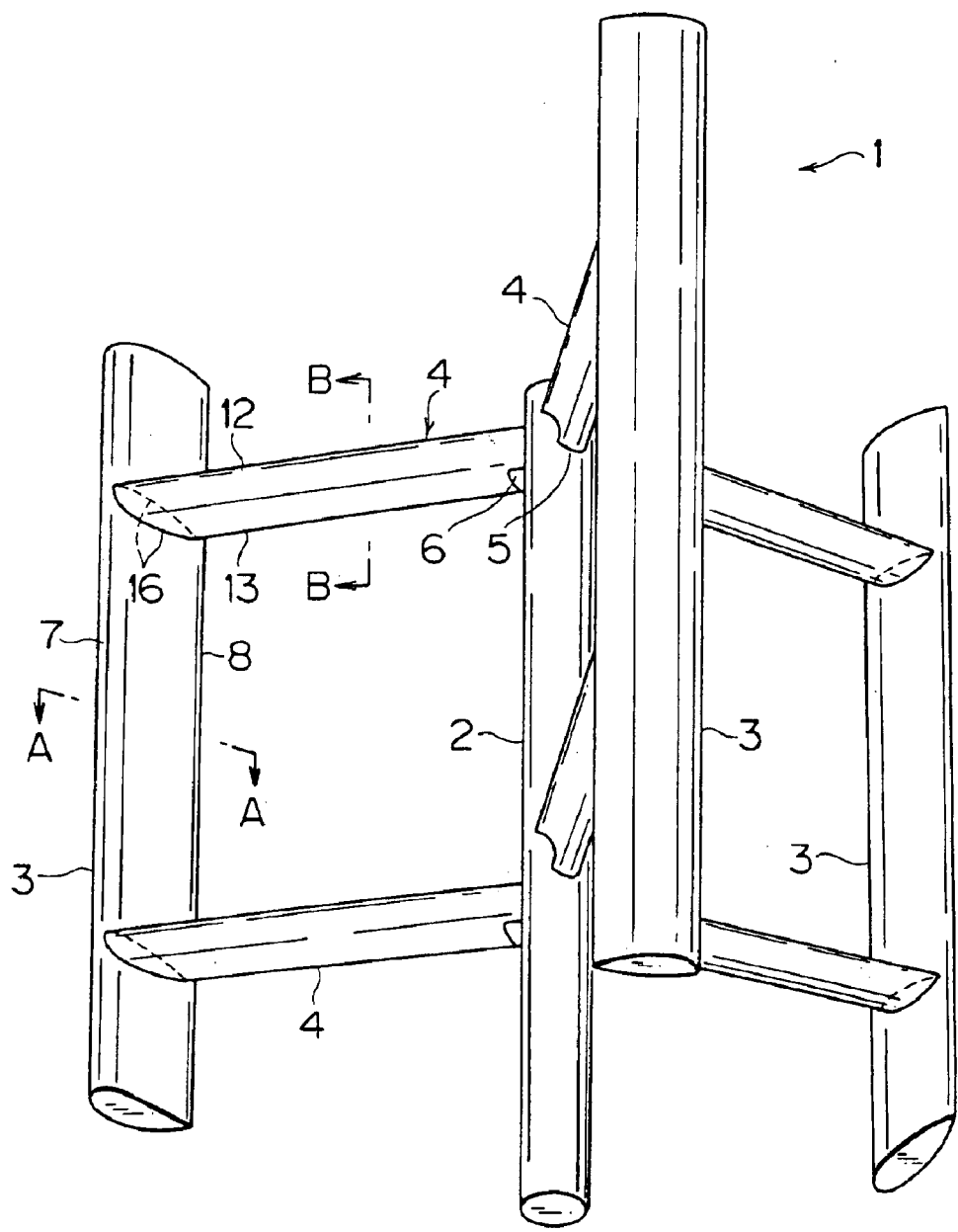
FIG. 1 is a perspective view illustrating a preferred embodiment of an integrated vane for use in wind or water according to the present invention.

FIG. 1 is a perspective view illustrating a preferred embodiment of an integrated vane for use in wind or water according to the present invention.

In an integrated vane 1 for use in wind or water, which is mainly used for wind power generation, straight blades (main blades) 3 longer than they are wide arranged in parallel with an axial shaft 2 of the vane 1 extending in the vertical direction and support blades 4 as support arms extending in the horizontal direction, which joins the straight blades 3 to the axial shaft 2, are integrally formed with each other (formed in one piece) with light and high strength fiber material such as glass fibers (GFRP) and carbon fibers (CFRP).

That is, as an example, one straight blade 3 and two support blades 4 arranged up and down are completely integrated with each other without any joint. A base end 5 of each support blade 4 is fixed to the axial shaft 2 with joining means (not shown) such as a bolt. As shown in FIG. 1, the base end 5 is joined to the axial shaft 2 on an extended line of a portion of the straight blade 3 near the front periphery 7, while the rear periphery 8-side of the base end 5 on an extended line is notched, which is shown with a notch 6.

Figure 2:
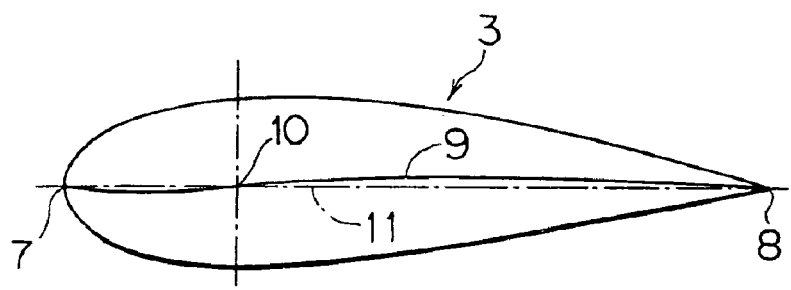
FIG. 2 is a cross sectional view taken along A—A line shown in FIG. 1 illustrating a cross sectional shape of a straight blade (main blade)

FIG. 2 is a cross sectional view taken along A—A line shown in FIG. 1 illustrating a cross sectional shape of a straight blade 3. Hatching is omitted in FIG. 2. The straight blade 3 has an asymmetrical two-dimensional wing shape, a mean line 9 of which curves downward from the front periphery 7 of the straight blade 3 (curving downward in FIG. 2, that is, curving toward the axial shaft 2 in FIG. 1), meets with a chord line 11 at the maximum thickness point 10 of the blade, and curves upward up to the rear periphery 8. As a result of this shape, the efficiency (i.e., power coefficient) can be increased without changing the mounting angle of the blade depending upon the flow direction of wind or water. The shape of the straight blade is disclosed in Japanese Patent Publication No. S56-42751.

Figure 3A:
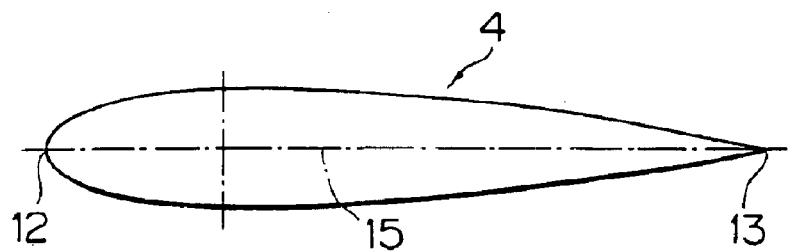
FIG. 3A is a cross sectional view taken along B—B line shown in FIG. 1 illustrating a cross sectional shape of a support blade.

FIG. 3A is a cross sectional view taken along B—B line shown in FIG. 1 illustrating a cross sectional shape of a support blade 4. The support blade is symmetrical, in which a mean line 15 agrees with a chord line 15 from the front periphery 12 to the rear periphery 13. Although to use a symmetrical blade for a support arm is known as disclosed in Japanese Patent Application Laid-Open No. H7-12045 (a vertical axis vane for use in wind, in which a duct blade is supported by a symmetrical blade), the construction of the vane, in which the straight blades 3 and the symmetrical support blades 4 are integrally formed with each other (formed in one piece), is novel.

Since a symmetrical blade is used for the support blade 4, the resistance arisen when the front periphery 12 receives wind or water in FIG. 1 can be reduced while the resistance arisen when the rear periphery 13 receives wind or water in FIG. 1 can be increased, thereby rotating the vane 1. Further, since the symmetrical support blade 4 has larger cross section and circumferential length compared to a flat plate-shaped support blade (not shown) and crosses the straight blade 3 with the curved line, therefore the static or dynamic strength and fatigue strength for the crossing portion (i.e., joined portion) 16 between the straight blade 3 and the support blade 4 increase, resulting in that the joined portion is not damaged by high number of revolutions beyond allowance or operation for a long period of time, because the straight blades 3 and the support blades 4 are formed integrally with each other. Further, the joined portion 16 can be made compact, light and to have low resistance.

Figure 3B:
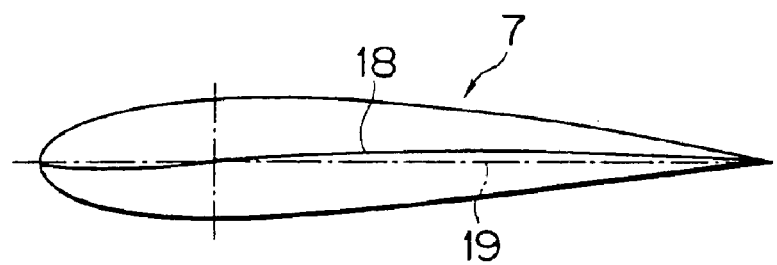
FIG. 3B corresponds to a cross sectional view taken along the B—B line illustrating a cross sectional shape of another preferred embodiment of a support blade.

FIG. 3B corresponds to a cross sectional view taken along the B—B line illustrating a cross sectional shape of another preferred embodiment of a support blade, in which the shape of the support blade 4 is asymmetrical tow-dimensional blade-shape 7. The upper support blade 4 shown in FIG. 1 has the asymmetrical shape 7 shown in FIG. 3B, while the lower support blade 4 shown in FIG. 1 has an up-and-down reversed shape of that of the upper support blade 4. In FIG. 3B, a mean line 18 and a chord line 19 are shown.

With the construction as described above, since the lift generated on the upper support blade 7 is canceled out by the downward force affecting the lower support blade (the blade which is formed by reversing the upper support blade 7 up and down), therefore smooth rotation can be attained, the thrust force affecting a bearing (not shown) of the axial shaft 2 can be reduced, and the lifetime of the bearing can be improved.

The axial shaft 2 is preferably a hollow outer rotor and a rotating shaft of a generator (not shown) is fixed to the end of the outer rotor 2, for example. By employing such an outer rotor, the weight of the axial shaft 2 is reduced, improving the start characteristic of the generator. By integrally forming the straight blades 3 and the support blades 4 with each other by using glass fibers or carbon fibers, the start characteristic and the efficiency (i.e., power coefficient) can be improved because of the light weight. Further, because of the integral formation as described above, the strength of the crossing portion 16 between the straight blade 3 and the support blade 4 is high. Since there is no joint (for example, a hole for joining) between them, the vane according to the present invention can be used not only as a vane for use in wind but also as a vane for use in water.

FIGS. 4–8 illustrate a preferred embodiment of a process for producing the integrated vane for use in wind or water as described above.

The process is characterized in that a plurality of layers of the fiber fabric 21 consisting of bag-shaped glass fibers or carbon fibers having no cut line are adhered to the surface of a preform (i.e., die) 20, which is one size smaller than the straight blade (main blade) 3 or the support blade 4.

In the following, the process will be explained in detail in sequence.

Figure 4:
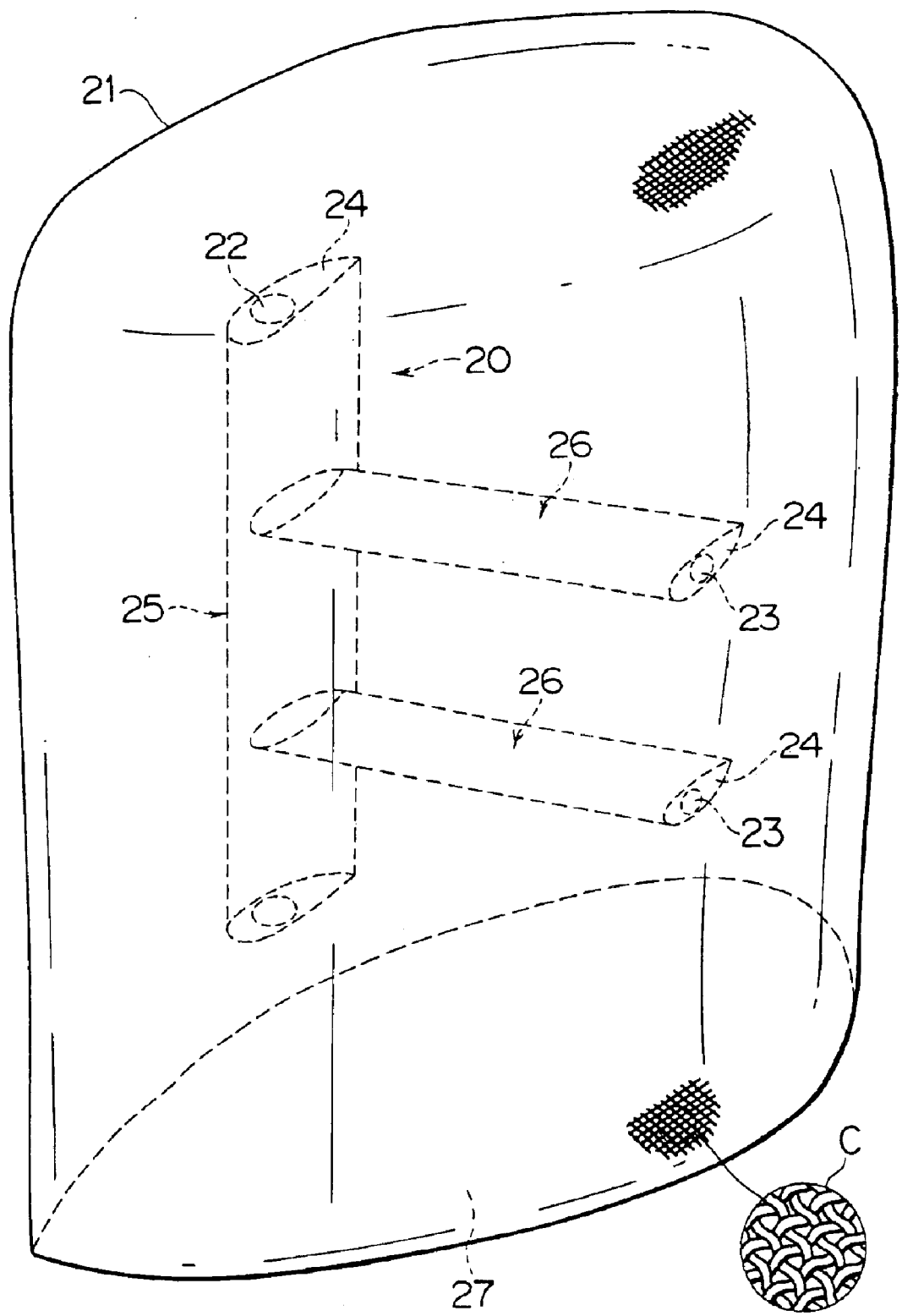
FIG. 4 is a perspective view illustrating a primary stage (a state in which a preform of a blade is covered with a fiber fabric) in a preferred embodiment of a process for producing an integrated vane for use in wind or water.

As shown in FIG. 4, first a preform (i.e., die) 20 is formed by using a hard core part 22, 23 for reinforcing and determining the position, which made of, for example, synthetic resin and a foamed styrol 24 which is light and compressible material for retaining the shape.

The core parts 22 and 23 of the preform 20 are penetratingly arranged in the length direction in the preform 25 of the straight blade (main blade) and the preform 26 of the support blade, respectively, and each core part 23 is fixed crossing the core part 22. The center of each core part 22, 23 approximately agrees with the center of the maximum thickness of the preform of the corresponding blade 3, 4 in FIG. 1. The foamed styrol 24 surrounds the core part 22 or 23 and is formed one size smaller than the straight blade 3 or the support blade 4 with a shape similar to the straight blade 3 or the support blade 4.

The preform 20 consisting of the preform 25 of the straight blade and the preform 26 of the support blade is covered with a large-sized fiber fabric 21 consisting of bag-shaped glass fibers or carbon fibers. As shown in an enlarged figure in a circle C in FIG. 4, in the fiber fabric 21, for example, fibers are compactly woven in two-dimensional direction like a normal cloth. It may be possible to weave the fibers in three-dimensional direction instead of two-dimensional direction so as to increase the bonding strength. The fiber fabric 21 can be mixed with, for example, thermoplastic synthetic resin. The fiber fabric 21 may be as thin as about 0.2 mm per sheet.

The thin fiber fabric 21 is formed to be a big bag and as shown in FIG. 4 the preform 20 is covered with a sheet of the bag-shaped fiber fabric 21 in the vertical direction in the figure with the length direction of the preform 25 of the straight blade being arranged in the vertical direction. The preform 20 is completely covered with the bag-shaped fiber fabric 21. In FIG. 4, an opening 27 of the bag-shaped fiber fabric 21 is shown.

Figure 5:
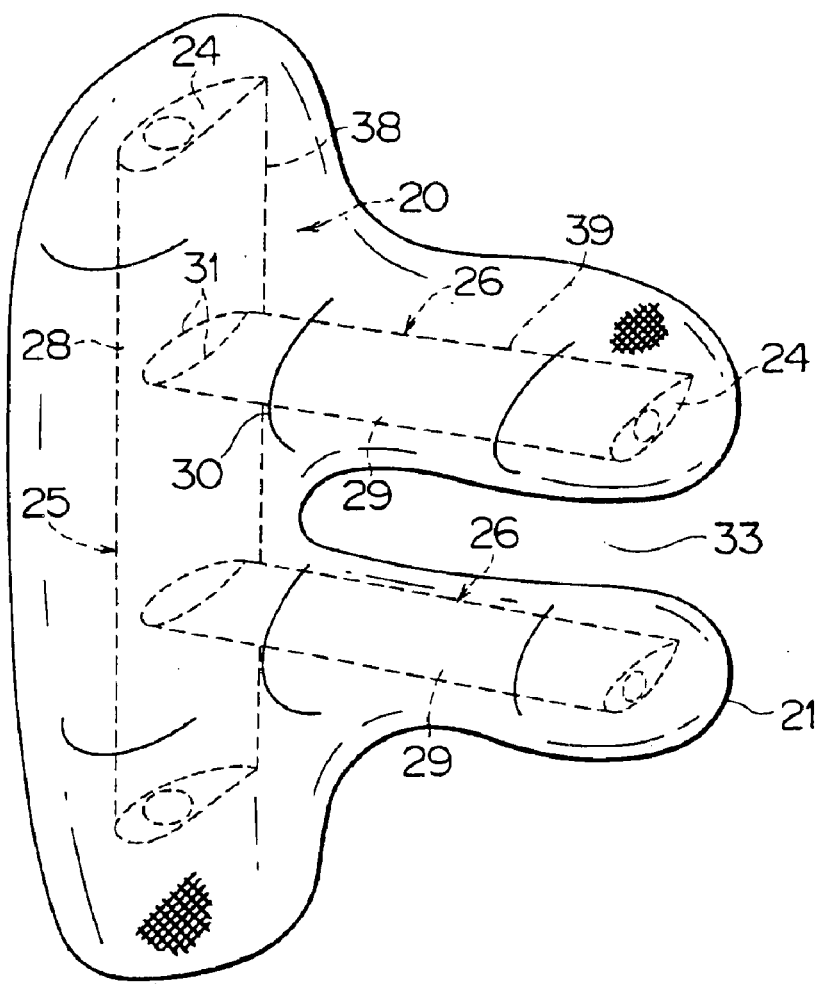
FIG. 5 is a perspective view illustrating a next stage (a state in which a fiber fabric is being formed imitating a preform of a blade) in a process for producing an integrated vane for use in wind or water.
Figure 7:
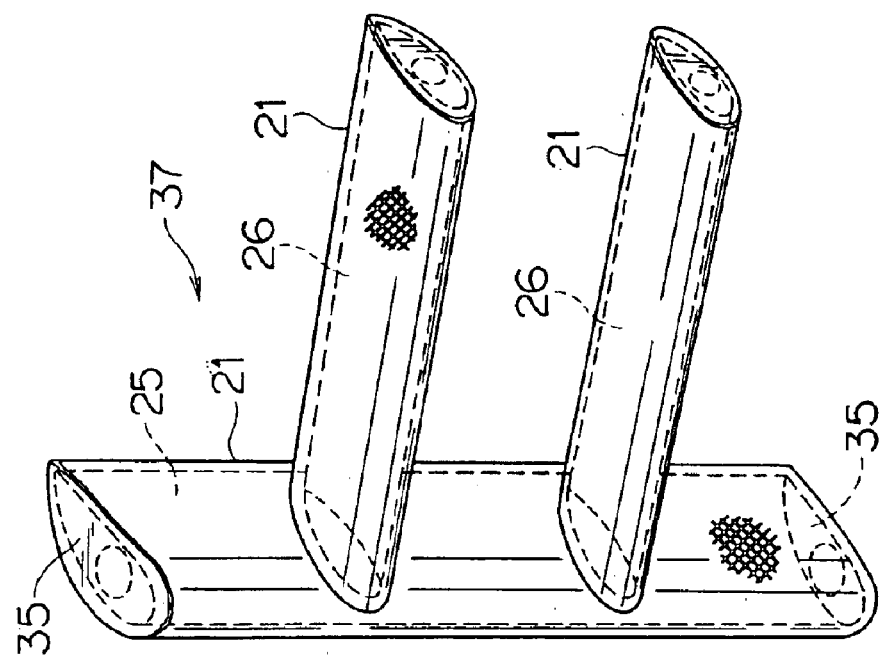
FIG. 7 is a perspective view illustrating a state in which a fiber fabric adheres to a preform of a blade.
Figure 6:
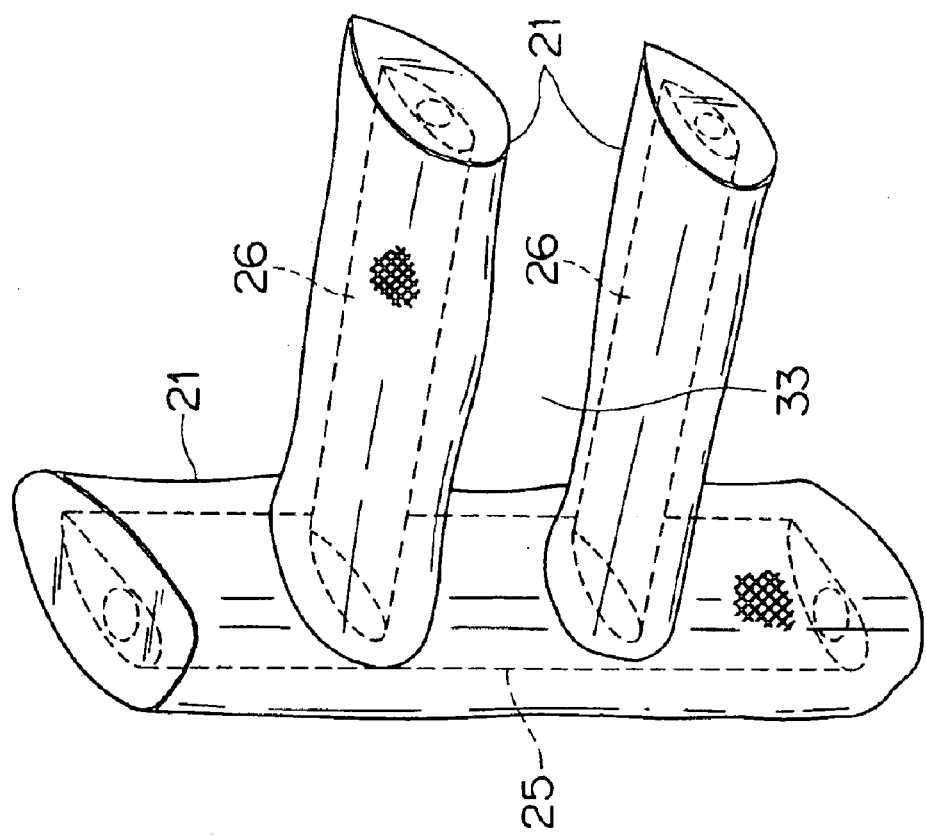
FIG. 6 is a perspective view illustrating a further next stage (a state in which a fiber fabric is pressed against a preform of a blade) in a process for producing an integrated vane for use in wind or water.

On such a condition, as shown in FIGS. 5–7, the fiber fabric 21 is pressed against the outer surface of the preform 20, that is, the outer surface of the foamed styrol 24 by means of vacuum evacuation (not shown) or the like and adhered thereto with an adhesive or the like. As shown in FIG. 5, for example, the preform 21 is entered into between the two preforms 26 of the support blade from the front periphery 29 of the support blade with bending the fiber fabric 21 in a U-shape 30. Preferably, the preform 21 is adhered to the preforms 25 and 26 from the peripheries 28 and 29, respectively, with bending the fiber fabric 21 in a U-shape 30.

Alternatively, the fiber fabric 21 is moved toward the preform 25 of the straight blade along the length direction of each preform 26 of the support blade between the two preforms 26 situated up and down, forming a gap 33 between the two preforms 26, and the preforms 25 and 26 are covered with the fiber fabric 21 as shown in FIGS. 6 and 7.

Figure 8:
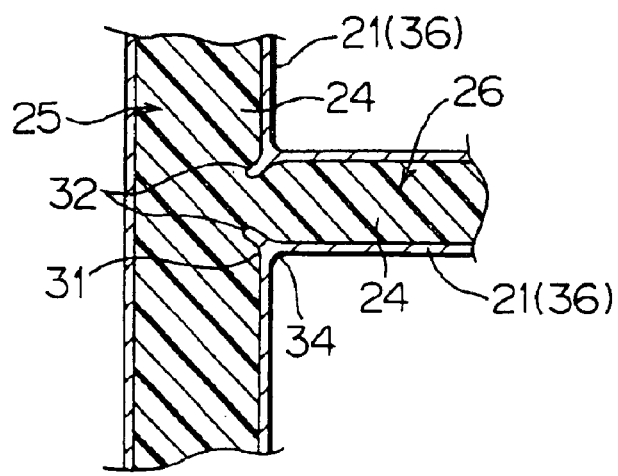
FIG. 8 is a longitudinal cross sectional view illustrating a state in which excess fiber fabric is pushed into the inside of a preform of a blade.

In the process of such a work described above, especially a sag easily occurs at the crossing portion (i.e., joined portion) 31 between the preforms 25 and 26. Therefore, as shown in FIG. 8 (the core part 22, 23 being not shown), the sagging portion 32 of the fiber fabric 21 is pushed into the inside of the foamed styrol 24 with a spatula or the like. For a portion where a sag occurs besides the crossing portion 31, such a sag is pushed into the inside of the foamed styrol 24. Such a pushing work can be easily securely curried out by pushing the sagging fiber fabric 21 into a rent of the foamed styrol 24 after the foamed styrol 24 is broken to make the rent. Thereby, the surface of each blade 3, 4 (in FIG. 1) can be smoothly finely finished without the sagging portion of the fiber fabric 21 protruding on the outer surface of each blade 3, 4. Further, a part of the fiber fabric 21 branchlikely enters into the inside of the foamed styrol 24, thereby improving the strength of the blades.

It may be avoided as mush as possible that the sag of the fiber fabric 21 is cut off with a scissors or the like. In the event that the fiber fabric is cut, the mechanical strength of the blades 3, 4 and the crossing portion 16 (in FIG. 1) may be deteriorated. If the sagging portion is pushed into the inside of the foamed styrol 24 as described in the preferred embodiment, such a deterioration in the mechanical strength can be prevented from occurring. Since the fiber fabric 21 may be as thin as 0.2 mm or so, therefore the pushing work of the sagging portion of the fiber fabric 21 into the inside of the foamed styrol 24 can be easily carried out.

The working process illustrated in FIGS. 5–8 per a sheet of the fiber fabric 21 is repeated. The number of layers of the fiber fabric sheets may be about 3 to 8. The pushing-in work of the sagging portions 32 (in FIG. 8) can be carried out per a sheet of the fiber fabric 21 or together after adhering all of the sheets of the fiber fabric 21. The adhesion work can be effectively carried out with a thermosetting adhesive such as an epoxy adhesive by heating. This heating is carried out after all of the sheets of the fiber fabric 21 are adhered.

At the crossing portion 31 between the preforms 25 and 26, the fiber fabric 21 may be adhered in a curved-shape 34 a little. The crossing portion 31 may be formed having a curved-shape in advance. The crossing portion 16 between the blade 3 and blade 4 having a curved-shape makes the strength of the crossing portion 16 large.

Preferably, both of the ends 35 up and down of the preform 25 of the straight blade is formed having a curved-shape a little so as to give a curve-shaped bulging portion (i.e., mountain-shaped portion; explained later on), thereby reducing noise arisen by the resistance due to wind or water. Preferably, a notch 6 is formed at the base end of the preform 26 of the support blade (i.e., the joint with the axial shaft 2) as shown in FIG. 1.

A plurality of the sheets of the bag-shaped fiber fabric 21 constitute a hard and rigid skin 36 (in FIG. 8). After the adhesion of a plurality of the sheets of the fiber fabric 21 is completed, a waterproof coating is applied, thereby completing an integrated formed body 37.

Preferably, the preform 20 is completely covered with a bag-shaped fiber fabric 21 without a gap. In the event that the bag is too large leaving a large rest of the fiber fabric 21, it is possible to cut the fiber fabric 21 on the rear periphery 38, 39-side (in FIG. 5) of each preform 25, 26. In such a case, however, the fiber fabric 21 must be adhered on the rear periphery 38, 39-side without a gap right and left, and up and down. Further, after a plurality of the sheets of the fiber fabric 21 are adhered to the preform 20, a fiber fabric having a rectangle shape or a curved-shape may be further adhered thereto in terms of finishing.

Thus completed integrated formed body 37 (in FIG. 7) is symmetrical in the up-and-down direction. Three pieces of the integrated formed body 37 are equivalently fixed to the axial shaft 2, thereby completing an integrated vane 1 for use in wind or water for use in wind or water power generation as shown in FIG. 1.

The support blades 4 up and down may be fixed to a round-shaped flange plate (not shown) instead of the long axial shaft 2 so that the center of the flange plate can be rotatably supported by a short axial shaft. The center of the axial shaft 2 or the center of the flange plate aligns with the axis.

The number of the straight blades 3 is determined according to the desired amount of electric generation. Only one straight blade 3 may be possible. Only one support blade 4 situated at the middle of the straight blade 3 in the vertical direction may be possible. The shape of the support blade 4 may be a flat plate shape having a rectangle in its cross section or an asymmetrical shape as shown in FIG. 3B instead of a symmetrical shape in its cross section. Further, although the efficiency is deteriorated, the straight blade 3 may be a two-dimensional symmetrical blade. Further, a curved blade (not shown) may be used instead of the straight blade 3. Furthermore, the main blade 3 or support blade 4 may be a three-dimensional blade.

The integrated vane 1 for use in wind or water may be disposed, for example, on a side wall of upper location of a tall building with the axial shaft 2 of the integrated vane 1 being set in the horizontal direction. Further, the integrated vane may be used for a thermal converter for converting water to hot water. If the vane 1 is used as a vane for use in water, each straight blade 3 is entered into water from the end of the length direction thereof with the axial shaft being held along the vertical direction. The length of entering of the straight blade 3 into water may be determined according to the desired amount of electric generation or the flow of water.

Further, for use in water, the cores 22, 23 of the preforms 25, 26 may be made of light metal such as aluminum alloy. Another kind of foamed plastic having a property of shape-retainer (property of not being very much dented when pushed while being broken when strongly pushed) may be employed instead of the foamed styrol 24 (i.e., polystyrene formed having air bubbles therein) of the preform 20. The preform 20 may be formed only with the foamed styrol 24 without using the cores 22, 23. In the process for producing an integrated vane 1 for use in wind or water as described above, the foamed styrol 24 and the core 23 is left behind inside the skin consisting of a plurality of the sheets of the fiber fabric 21, however, when the ends of the length direction of each blade 3, 4 is formed at last, the foamed styrol 24 or the core 23 may be taken out before the ends of the blade are formed.

Figure 9A:
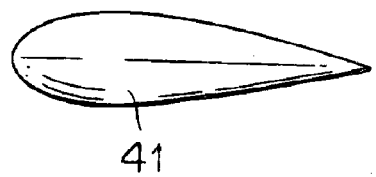
FIG. 9A is a plan view illustrating a preferred embodiment in which a mountain-shaped portion for noise control is formed at the end of a straight blade.
Figures 9B, 9C:
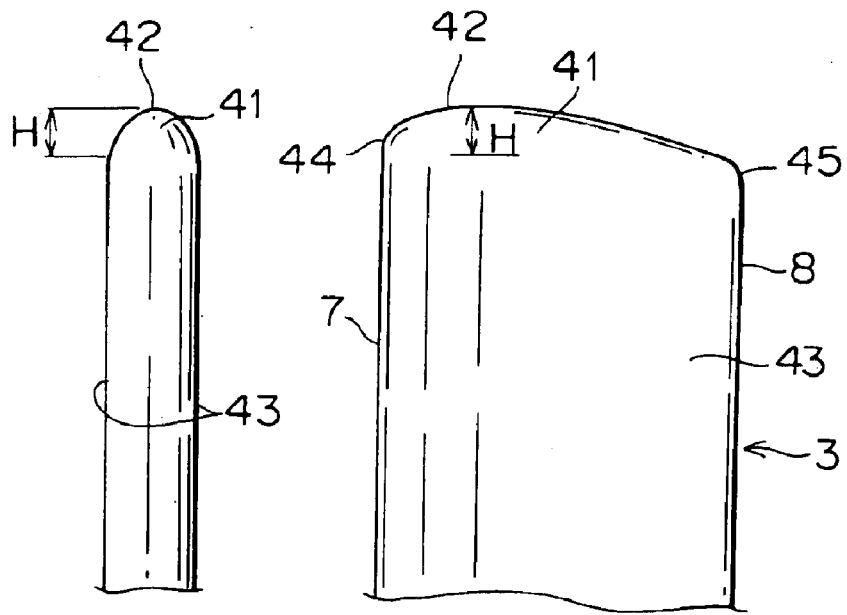
FIG. 9B is a front view illustrating a preferred embodiment in which a mountain-shaped portion for noise control is formed at the end of a straight blade.
FIG. 9C is a side view illustrating a preferred embodiment in which a mountain-shaped portion for noise control is formed at the end of a straight blade.

FIGS. 9A–9C are a view illustrating a preferred embodiment in which a mountain-shaped portion (having its length of about half of the thickness of the blade) 41 for noise control is formed at the end of a straight blade (main blade) 3. FIG. 9A is a plan view of the straight blade 3, FIG. 9B is the front view and FIG. 9C is the side view. The mountain-shaped portion 41 has a shape that the cross section shape of the blade is cut by about half along the chord line 11 (in FIG. 2) and has an about symmetrical shape right and left in a front view thereof as shown in FIG. 9B. That is, the blade section of a straight blade is cut by half thereof, thus obtained cross sectional shape is made to be a longitudinal cross section of the mountain-shaped portion 41, and the top 42 of the longitudinal cross section is smoothly curvedly connected to the side 43 of the straight blade 3.

As shown in FIG. 9B, the top 42 of the mountain-shaped portion 41 is smoothly curvedly formed from the front end to about the middle of the blade (in FIG. 9A) in the thickness direction and the edge line portion of the top 42 gradually becomes thin as the width of the mountain-shaped portion 41 becomes narrow from the middle to the rear end in FIG. 9A. The front end 44 and rear end 45 of the mountain-shaped portion 41 are smoothly continued to the front end 7 and the rear end 8 of the straight blade 3, respectively. The mountain-shaped portion 41 is formed integrally (i.e., formed in one piece) with the straight blade 3 with the fiber fabric 21.

The ratio of the thickness of the mountain-shaped portion 41, that is, the maximum height (i.e., maximum blade thickness) H relative to the blade chord length is restricted to some extent by the blade thickness of the straight blade 3 and is preferably about (24–34%)/2, that is, about 12–17%. Here, the (24–34%) is the blade thickness of the blade section before forming the mountain-shaped portion 41 and the reason of dividing by 2 is based on that the blade section is approximately symmetrical (if it is a symmetrical blade section, the factor is precisely ½). These optimum ranges are based on the experiments. A condition deviated from these optimum ranges is also efficient for noise control.

The mountain-shaped portion 41 reduces or completely attenuates the noise due to the resistance by wind or water upon rotation of the vane. This is because the mountain-shaped portion 41 reduces or completely attenuates the occurrence of a vortex of wind or water at the rear of the ends of the blade.

In a process for producing an integrated vane having the mountain-shaped portion 41 as shown in FIGS. 9A–9C, for example, a bulging portion (mountain-shaped portion) one size smaller than the mountain-shaped portion 41 (that is, smaller than the mountain-shaped portion 41 by the thickness of the fiber fabric 21) is formed by using foamed styrol and is joined with the ends up and down of the foamed styrol 24 of the preform 25 of the straight blade shown in FIG. 4, or the foamed styrol 24 is provided integrally with a bulging portion (mountain-shaped portion) separately from the core 22 so as to form the preform 20, thereafter a plurality of layers of the fiber fabric 21 are adhered to the preform 20 by using a method as shown in FIGS. 4–8, thereby the mountain-shaped portion 41 formed integrally with the straight blade (main blade) 3 can be easily precisely formed.

The aforementioned preferred embodiments are described to aid in understanding the present invention and variations may be made by one skilled in the art without departing from the spirit and scope of the present invention.

What is claimed is:

1. An integrated vane for use in wind or water comprising: main blades arranged around an axial shaft of the vane; and support blades for joining the main blades to the axial shaft, wherein the main blades are unitarily formed together with the support blades with no joint or gap between the main blades and support blades, said main blades and support blades being formed from light and high strength fiber material including at least one glass fibers and carbon fibers.

2. The integrated vane for use in wind or water according to claim 1, wherein the main blade is symmetrical or asymmetrical in its cross sectional view and the support blade is symmetrical in its cross sectional view.

3. An integrated vane for use in wind or water comprising: main blades arranged around an axial shaft of the vane; and support blades for joining the main blades to the axial shaft, wherein the main blades and the support blades are formed integrally with light and high strength fiber material such as glass fibers and carbon fibers, wherein the main blade is symmetrical or asymmetrical in its cross sectional view, the upper support blade is asymmetrical in its cross sectional view, and the lower support blade has an up-and-down reversed shape of that of the upper support blade.

4. The integrated vane for use in wind or water according to claim 1, wherein a mountain-shaped portion having a height of about half of the blade thickness is integrally formed at ends of the main blade in the axial direction.

5. The integrated vane for use in wind or water according to claim 2, wherein a mountain-shaped portion having a height of about half of the blade thickness is integrally formed at ends of the main blade in the axial direction.

6. An integrated vane for use in wind or water comprising: main blades arranged around an axial shaft of the vane; and support blades for joining the main blades to the axial shaft, wherein the main blades and the support blades are formed integrally with light and high strength fiber material such as glass fibers and carbon fibers, wherein a mountain-shaped portion having a height of about half of the blade thickness is integrally formed at ends of the main blade in the axial direction.

7. The integrated vane for use in wind or water according to claim 1, wherein the main blades and support blades are unitarily formed together in a fixed orientation.

* * * * *